United States Patent
O'Brien et al.

[19]

[11] Patent Number: 5,917,151
[45] Date of Patent: Jun. 29, 1999

[54] MULTI-SHOT MOLDS FOR MANUFACTURING WIRE HARNESSES

[75] Inventors: Timothy F. O'Brien, White Lake; Joseph J. Davis, Jr., Ortonville; Robert L. Frendewey, Commerce Twp., all of Mich.

[73] Assignee: UT Automotive Dearborn, Inc., Dearborn, Mich.

[21] Appl. No.: 08/920,857

[22] Filed: Aug. 29, 1997

[51] Int. Cl.⁶ .................................................. H01B 3/00
[52] U.S. Cl. ........................ 174/72 A; 174/74 R; 29/868; 29/825; 439/604; 264/45.3
[58] Field of Search ............................ 174/72 A, 73.1, 174/74 R, 75 R, 117 F, 112, 36; 29/825, 857, 868; 428/217, 156; 439/604, 606; 307/10.1; 361/826; 264/45.3

[56] References Cited

U.S. PATENT DOCUMENTS

| | | | |
|---|---|---|---|
| 2,933,550 | 4/1960 | Cole et al. ................................ | 174/76 |
| 3,946,768 | 3/1976 | Fiorentino . | |
| 3,985,951 | 10/1976 | Harris . | |
| 4,158,746 | 6/1979 | Taylor et al. ............................ | 174/112 |
| 4,270,961 | 6/1981 | Faranetta et al. . | |
| 4,280,062 | 7/1981 | Miller et al. .............................. | 315/82 |
| 4,444,705 | 4/1984 | Kumasaka et al. . | |
| 4,653,155 | 3/1987 | Hara . | |
| 4,824,164 | 4/1989 | Nakayama et al. .................. | 296/146.7 |
| 4,869,670 | 9/1989 | Veda et al. ................................ | 439/34 |
| 4,923,537 | 5/1990 | Matsushima . | |
| 5,030,116 | 7/1991 | Sakai et al. . | |
| 5,082,253 | 1/1992 | Suzuki et al. . | |
| 5,168,124 | 12/1992 | Takase et al. . | |
| 5,230,146 | 7/1993 | Tsuji et al. . | |
| 5,324,203 | 6/1994 | Sano et al. ................................ | 439/34 |
| 5,338,014 | 8/1994 | Kitamura . | |
| 5,374,778 | 12/1994 | Hashimoto et al. ...................... | 174/36 |
| 5,378,853 | 1/1995 | Clouet et al. ............................. | 174/36 |
| 5,490,664 | 2/1996 | Justus et al. . | |
| 5,500,179 | 3/1996 | Onishi et al. . | |
| 5,535,511 | 7/1996 | Karasik . | |
| 5,598,627 | 2/1997 | Saka et al. . | |
| 5,688,135 | 11/1997 | Gallagher, Sr. et al. ............... | 439/214 |

FOREIGN PATENT DOCUMENTS

| | | | |
|---|---|---|---|
| 0235924 | 1/1987 | European Pat. Off. . | |
| 0288752 | 3/1988 | European Pat. Off. . | |
| 3337596 | 10/1983 | Germany . | |
| 19628850 | 7/1996 | Germany . | |
| 2262846 | 6/1993 | United Kingdom ................. | 174/72 A |

*Primary Examiner*—Kristine Kincaid
*Assistant Examiner*—Dhiru R Patel
*Attorney, Agent, or Firm*—Howard & Howard

[57] ABSTRACT

A wire harness includes a plurality of wires surrounded by a continuous molded sheath. The sheath includes a first section made of a first material and a second section integral with the first section and made of a second material different from the first material. The different materials provide different colors, such as for color-coding branches of the wire harness. The different materials also provide areas of increased abrasion resistance to mechanical wear, temperature resistance and chemical resistance.

17 Claims, 2 Drawing Sheets

MULTI-SHOT MOLDS FOR MANUFACTURING WIRE HARNESSES

BACKGROUND OF THE INVENTION

The present invention relates to wire harnesses, and more particularly to a wire harness having a continuous molded sheath formed in a multi-shot mold in order to produce sections with different properties, such as durometer or color.

Current vehicles include numerous wire harnesses interconnecting an increasing number of electrical components to user-activated and computer-controlled switches and sensors. Each wire harness comprises a plurality of wires which are bundled to form a main trunk and a plurality of branches extending from the trunk. Typically, each of the branches includes an electrical connector at an outer end.

During assembly of wire harnesses, the wire bundles are held together in an assembly jig, which includes a plurality of wire supports supporting the wires along each of the main trunk and each of the branches. Each wire is placed into the assembly jig onto the appropriate wire supports, i.e. from a first branch at one end of the wire harness, through the main trunk and through a second branch, typically at an opposite end of the wire harness. Electrical connectors are then connected to the outer ends of the wires at the branches. The wires are then wrapped with tape along the entire length of the main trunk and each of the branches. Plastic tubes or sleeves are often secured around the bundled wires in selected locations to protect against mechanical wear caused by vibration. Foam sheets are often wrapped and taped about the bundles in selected areas to provide damping and reduce noise. Fasteners, such as christmas tree connectors, are secured to the bundled wires, with the wrapped tape. Rubber gaskets are secured to selected portions of the bundled wires in order to provide water seals at selected locations. Branch identifiers, such as tape labels are often wrapped about the branches near the connectors in order to identify the branch so it is properly mounted and connected.

United Technologies Automotive has developed a new wire harness in which the wires are encased in a molded foam sheath. This is described in more detail in co-pending application U.S. Ser. No. 08/898,663, filed on Jul. 22, 1997 entitled "FOAMED-IN WIRE HARNESSES." Improvements are more fully disclosed in other co-pending applications: "WIRE HARNESS WITH INTEGRAL CONNECTOR" filed on Aug. 29, 1997 and assigned U.S. Ser. No. 08/920,768; "APPARATUS FOR CENTERING WIRE HARNESS IN MOLD" filed on Aug. 29, 1997 and assigned U.S. Ser. No. 08/920,458; "MOLD FOR ASSEMBLING AND FORMING WIRE HARNESS" filed on Aug. 29, 1997 and assigned U.S. Ser. No. 08/919,946; "WIRE HARNESS WITH SPLICE LOCATORS" filed on Aug. 29, 1997 and assigned U.S. Ser. No. 08/920,589; "METHOD AND APPARATUS FOR SECURING WIRE HARNESS TO SURFACE" filed on Aug. 29, 1997 and assigned U.S. Ser. No. 08/920,978; "FOAM WIRE HARNESS WITH SHAPE MEMORY" filed on Aug. 29, 1997 and assigned U.S. Ser. No. 08/920,570.

SUMMARY OF THE INVENTION

The present invention provides a wire harness generally comprising a plurality of wires encased by a continuous polymer sheath having sections of different material. The different materials may be used to color-code branches of the wire harness. Other materials may be used to provide certain areas of the wire harness with increased abrasion resistance, temperature resistance or chemical resistance.

In the method of the present invention, a plurality of wires are routed in a mold having a trough. A first polymer is introduced into a first portion of the trough and a second polymer different having properties different from the first polymer is introduced into a second portion of the trough. The first and second polymers are molded around the plurality of wires and form a continuous sheath around the plurality of wires.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DETAILED DESCRIPTION OF A PREFERRED EMBODIMENT

Figure 1:
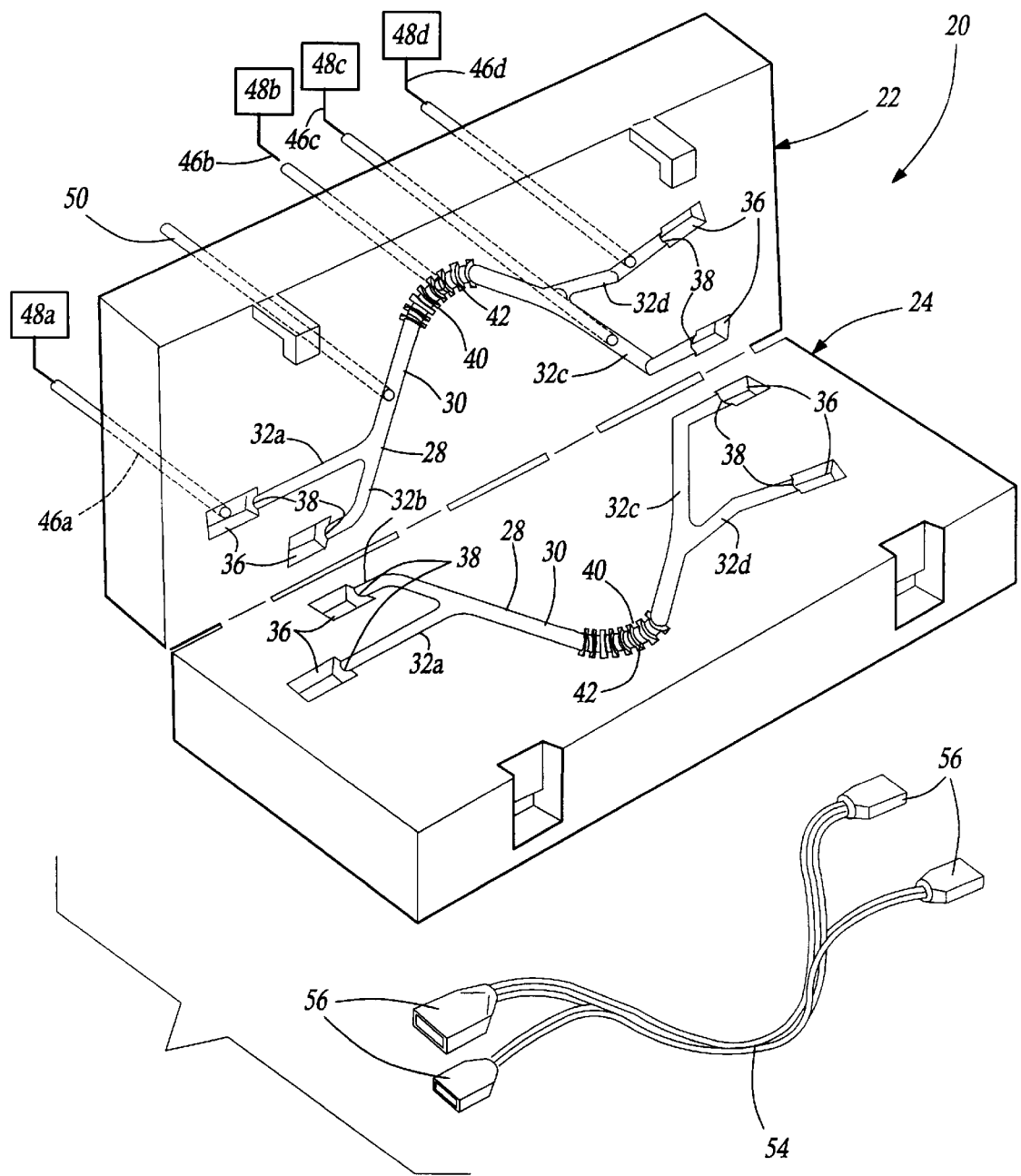
FIG. 1 is a perspective view of a mold for manufacturing the wire harness of the present invention.

A mold 20 for manufacturing a wire harness comprises an upper mold 22 and a lower mold 24 having complementary troughs 28. Each trough 28 includes a main trunk 30 continuous with a plurality of branches 32a–d. At the end of each branch is a slight recess 36 separated from the remainder of the trough 28 by a wall 38.

Each trough 28 includes a reinforced section 40 having a diameter greater than the remainder of the trough 28 and including a plurality of convolutes 42. The convolutes 42 are shown as concentric, axially-spaced rings; however, it should be apparent that spiral rings, or any deep mold cuts, including irregular shapes, could also be utilized.

The mold 20 includes a plurality of supply ports 46a–d for supplying a polymer to the mold 20. Preferably the polymer is a two part foam, most preferably Elastoflex®, available from BASF. Preferably each of the supply ports 46a–d supplies a slightly different polymer as will be described. First, the supply port 46a which supplies the main trunk 30 and two of the branches 32a,b preferably supplies a first polymer foam 48a which is flexible, but has some shape memory. The first polymer 48a is preferably black in color. The second supply port 46b preferably supplies a stiffer, harder polymer 48b, again preferably Elastoflex®, to the reinforced section 40. A third supply port 46c one of the branches 32c with a third polymer 48c, preferably identical to that supplied by supply port 46a, other than it is color-coded, preferably red. The fourth supply port 46d supplies branches 32d with a fourth polymer 48d, preferably identical to that supplied by the first supply port 46a, other than the color, which is preferably blue. The mold 20 further includes at least one excess port 50 for permitting the removal of excess foam during molding.

During operation, a plurality of wires 54 are routed in the trough 28 of the lower mold 24. The electrical connectors 56 are connected to the ends of the wires 54 and placed in the recesses 36, which are separated from the polymer by walls 38. The upper mold 22 is then closed and the four polymers are supplied by supply ports 46a–d. The four polymers 48a–d blend somewhat at their junction and form a continuous sheath.

Figure 2:
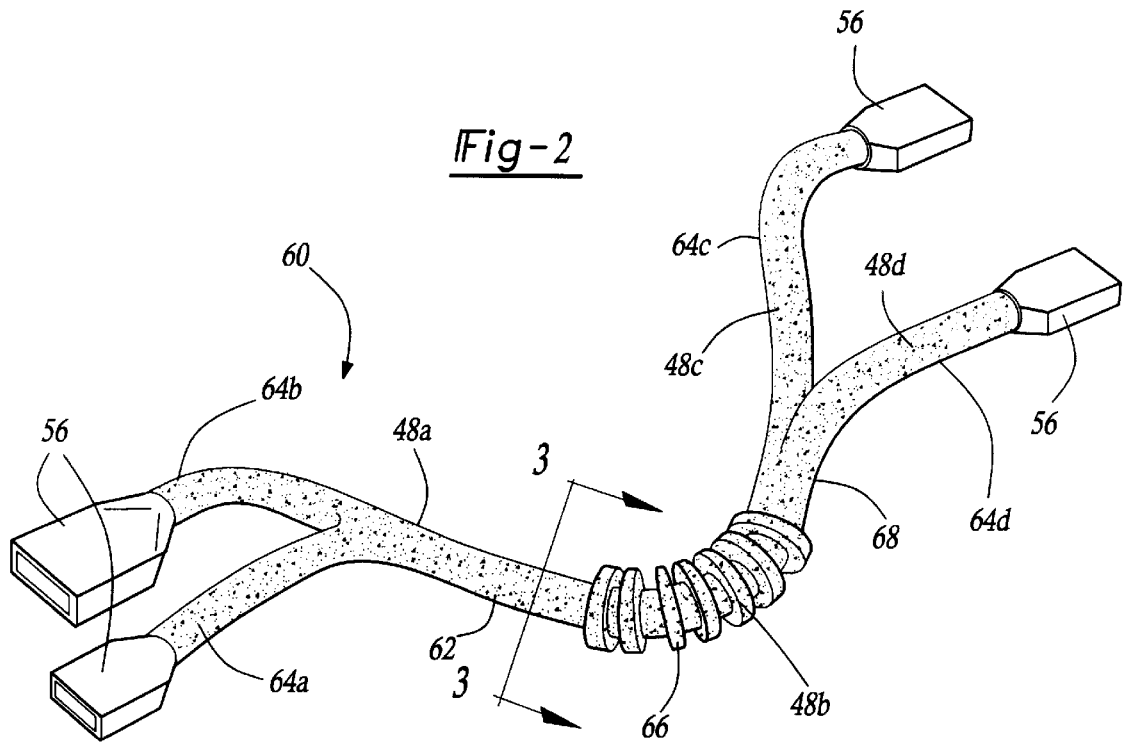
FIG. 2 is the wire harness of the present invention manufactured in the mold of FIG. 1.

A wire harness 60 formed in the mold 20 of FIG. 1 is shown in FIG. 2. The wire harness 60 includes a main trunk 62 branching into a plurality of branches 64. An electrical connector 56 is secured to the outer end of each branch 64. A continuous sheath 68 formed of the four polymers 48a–d is molded continuously over the main trunk 62 and branches 64 up to the electrical connectors 56. The sheath 68 over the first branch 64a, second branch 64b and main trunk 62 is preferably formed with the first polymer 48a and is thus black in color and fairly flexible with shape memory. The sheath 68 over the reinforced section 66 is formed of the second polymer 48b and therefore has increased stiffness, hardness and abrasion resistance. The sheath 68 over the branch 64c is formed of the third polymer 48c, identical to the first polymer 48a but red in color. The sheath 68 over the branches 64d is formed of the fourth polymer 48d which is blue in color.

The wire harness 60 of the present invention thus provides color identification of the branches 64c–d. Further, the wire harness 60 includes a reinforced section 66 having an increased diameter and increased stiffness, hardness and abrasion resistance to protect the wires 54 against wear from mechanical vibration. It should be apparent that other materials could also be utilized, such as other polymers other than foam. Further, sections of the sheath 68 could be formed of polymers with other beneficial properties, such as temperature or chemical resistance, or varying stiffness and hardness, etc.

Figure 3:
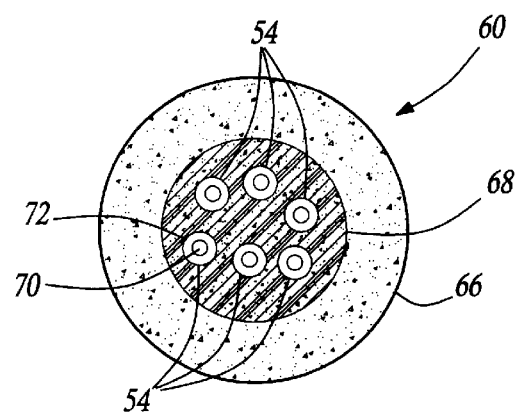
FIG. 3 is a sectional view of the wire harness of FIG. 2 taken along line 3—3.

As can be seen in FIG. 3, the sheath 68 is molded around an among the plurality of wires 54. Each of the wires 54 includes a conductor 70 encased by an insulator 72.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A wire harness comprising:
    a plurality of wires;
    a sheath molded around said plurality of wires, wherein said sheath has a first branch and a second branch, said first branch of said sheath comprising a first polymer, said second branch of said sheath comprising a second polymer different from said first polymer, wherein said first polymer has higher stiffness than said second polymer.

2. The wire harness of claim 1 wherein said sheath is a polymer molded around and among said plurality of wires.

3. The wire harness of claim 1 wherein said first polymer has a different color from said second polymer.

4. The wire harness of claim 1 wherein said plurality of wires comprises a plurality of first wires and a plurality of second wires bundled by said sheath in a main trunk, said main trunk branching into said first branch and said second branch, said first branch extending from said main trunk and including said plurality of first wires, said sheath continuously molded around said main trunk and said first branch, said main trunk comprising said second branch.

5. The wire harness of claim 1 wherein said first branch is integrally molded with said second branch.

6. A wire harness comprising:
    a plurality of wires;
    a sheath molded around said plurality of wires, wherein said sheath has a first branch and a second branch, said first branch of said sheath comprising a first polymer, said second branch of said sheath comprising a second polymer different from said first polymer, wherein said first polymer has higher hardness than said second polymer.

7. A wire harness comprising:
    a plurality of wires;
    a sheath molded around said plurality of wires, wherein said sheath has a first branch and a second branch, said first branch of said sheath comprising a first polymer, said second branch of said sheath comprising a second polymer different from said first polymer, wherein said first polymer has higher temperature resistance than said second polymer.

8. A wire harness comprising:
    a plurality of wires;
    a sheath molded around said plurality of wires, a first branch of said sheath comprising a first polymer, a reinforced branch of said sheath comprising a second polymer different from said first polymer, said second polymer having higher stiffness than said first polymer wherein said reinforced branch has an increased diameter.

9. The wire harness of claim 8 wherein said reinforced branch has a plurality of molded convolutes.

10. A wire harness comprising:
    a main trunk having a plurality of first wires and a plurality of second wires, said main trunk branching into a first branch and a second branch;
    said first branch extending from said main trunk, said first branch including said plurality of first wires;
    said second branch extending from said main trunk, said second branch including said plurality of second wires;
    said main trunk, said first branch and said second branch encased in a continuous sheath, a first portion of said sheath over said first branch comprising a first polymer, a second portion of said sheath over said second branch comprising a second polymer different from said first polymer, said first and second polymers being polymer foam.

11. The wire harness of claim 10 wherein said first and second polymers are different colors.

12. The wire harness of claim 10 wherein said sheath is molded around and among each of said plurality of first and second wires.

13. A method for manufacturing a wire harness including the steps of:
    a) routing a plurality of wires in a mold having a trough;
    b) introducing a first polymer foam into a first branch of said trough, after said step a);
    c) introducing a second polymer foam different from said first polymer into a second branch of said trough, after said step a);
    d) molding said first and second polymer foams around said plurality of wires.

14. The method according to claim 13 wherein said first polymer foam is a different color than said second polymer foam.

15. The method according to claim 13 wherein said step d) includes the step of molding said first and second foams around and among said plurality of wires.

16. The method of claim 13 wherein said trough includes a main trunk and first and second branches branching from said trunk, said first portion comprising said first branch, said second portion comprising said second branch.

17. The method according to claim 16 wherein said first polymer foam is a different color than said second polymer foam.

* * * * *